Figure 1:
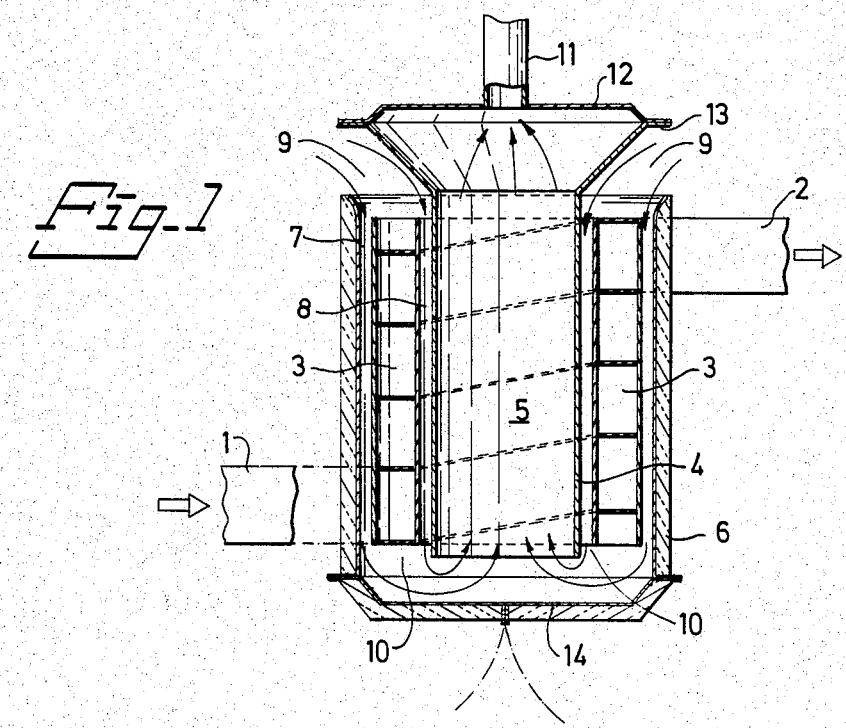

United States Patent [19]

Kölhi

[11] Patent Number: 4,528,761
[45] Date of Patent: Jul. 16, 1985

[54] METHOD AND APPARATUS FOR DRYING AND/OR PRE-HEATING LUMP MATERIAL, FOR EXAMPLE SCRAP METAL

[75] Inventor: Martti Kölhi, Stenhamra, Sweden

[73] Assignee: Allmänna Ingenjörsbyrån AB, Sweden

[21] Appl. No.: 564,088

[22] Filed: Dec. 21, 1983

[30] Foreign Application Priority Data

Dec. 29, 1982 [SE] Sweden .................... 8207462

[51] Int. Cl.$^3$ ............................................. F26B 3/16
[52] U.S. Cl. .......................................... 34/35; 34/86; 34/168; 34/202; 34/68; 165/155
[58] Field of Search .................. 165/155; 34/35, 86, 34/168, 169, 202, 219, 39, 68; 432/217, 218, 215

[56] References Cited

U.S. PATENT DOCUMENTS

| 894,507 | 7/1908 | King | 165/155 |
| 969,484 | 9/1910 | Koegler | 165/155 |

Primary Examiner—Larry I. Schwartz
Attorney, Agent, or Firm—Andrus, Sceales, Starke & Sawall

[57] ABSTRACT

A method and apparatus for drying and/or pre-heating in particular scrap metal with the aid of waste gases deriving from an electric arc furnace. The waste-gases are passed from the electric arc furnace through a line (1,2,3) which is arranged between an external, outwardly insulated container (6) and an inner container (4) for accommodating the scrap metal, with a gap (7,8) located between the waste-gas line and the containers. Air is drawn in through the gap (7,8) and absorbs heat from the wall (3) of the waste-gas line, whereafter the heated air is caused to pass through the scrap (5) in the inner container (4) and to deliver heat to the scrap.

3 Claims, 2 Drawing Figures

METHOD AND APPARATUS FOR DRYING AND/OR PRE-HEATING LUMP MATERIAL, FOR EXAMPLE SCRAP METAL

The present invention relates to a method and an apparatus for drying and/or pre-heating lump material, for example scrap metal, with the aid of waste gases derived from processes, for example the waste gases from an electric arc furnace. The apparatus according to the invention is connected in the waste-gas line, and comprises an external, outwardly insulated container, and an inner container for accommodating said lump material.

Arc furnaces are, for example, charged with scrap which when stored outside in the open may have snow and ice mixed therewith. This snow and ice can cause serious explosion to occur, when coming in direct contact with a bath of molten steel. This risk of explosion can be avoided by drying or pre-heating the scrap metal. In addition to drying the scrap there is afforded the extra advantage that less energy is consumed in the furnace and that the periods between two furnace-tapping operations can be made shorter. Electrode consumption is also decreased as result of this pre-heating.

Although apparatus for pre-heating scrap metal, in which the waste gases come into direct contact with the scrap are known to the art, these apparatus are very expensive, since they often require extensive modification to the present furnace equipment. The known apparatus are also bulky and space consuming. The known apparatus are also expensive to maintain, among other things because the valves incorporated in the apparatus come into direct contact with the hot dust-laden streams of waste gas. Since the streams of waste gas pass directly through the scrap, the dust collected on said scrap is entrained with said waste gases, causing clouds of dust to be released in the furnace hall when charging the furnace, and also "contaminating" the charge.

An object of the present invention is to provide a method and an apparatus in which the process gases, for example, deriving from arc furnaces can be used for drying and/or pre-heating lump material, such as scrap metal, and in which less total energy is consumed in the process.

The method according to the invention is characterized by causing the waste gases to flow through a waste-gas line between an external, outwardly insulated container and an inner container for the scrap material, with a gap located at least between the waste-gas line and the external container, air being drawn in through said gap so as to absorb heat from the wall of the waste-gas line, and by causing the thus heated air to pass through the material in the inner container and delivering heat to said material.

The apparatus for carrying out the method according to the invention is characterized in that the waste-gas line is extended in a space between the two containers, so as to form a gap at least between the external container and the waste-gas line said gap being intended for drawing-in air for absorbing heat from the wall of the waste-gas line, and for transferring heat to the material in the inner container by direct contact with said material.

Among those advantages afforded by the invention is that the apparatus according to the invention can be filled and emptied without requiring the arc furnace to be shut down. Moreover, the apparatus according to the invention enables larger heat-transfer services to be used while maintaining apparatus compactness. Neither does the apparatus require valves which must operate at high temperatures and with dust-laden waste-gases. It is also possible with the apparatus according to the invention to re-cycle the drying and pre-heating air.

Figure 2:
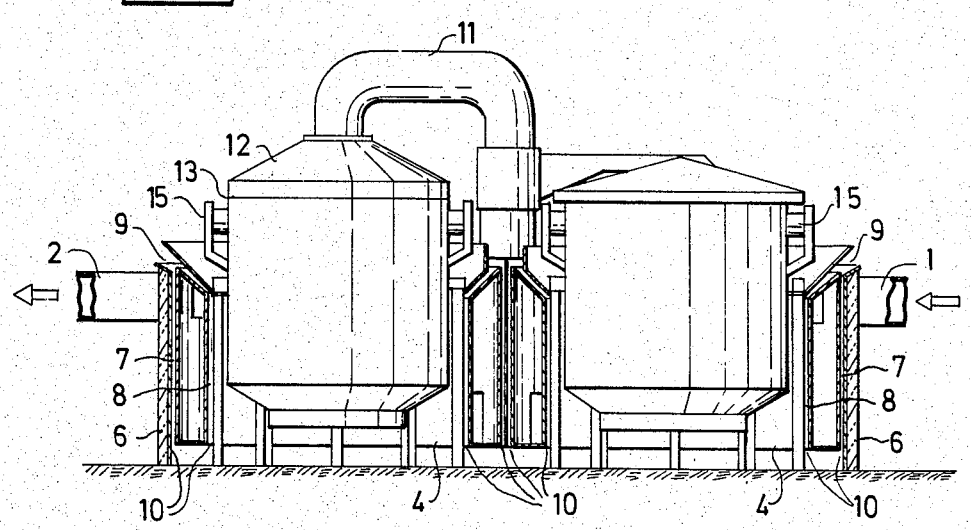

The method and apparatus according to the invention will now be described in detail with reference to the accompanying schematic drawings, FIG. 1 of which is a longitudinal sectional view of a first embodiment of an apparatus according to the invention and FIG. 2 is a side view of a second embodiment of the apparatus. Similar parts have the same reference numerals in the two figures.

The apparatus illustrated in FIG. 1 is connected in the waste-gas line extending from an arc furnace, the waste gases from the furnace being introduced into the line in the waste-gas line extending from an arc furnace, the waste gases from the furnace being introduced into the line at an inlet 1 and discharged therefrom at an outlet 2, from where the waste gases are passed to a filter not shown. That part of the waste-gas line located between the inlet 1 and the outlet 2 has a form of a helix 3 extending around the inner container or cylinder 4 accommodating the scrap 5. The container or cylinder 4 has no bottom. Arranged externally around the helical waste-gas line 3 is an external container or cylinder 6, the outer surfaces of which are insulated. The apparatus is so dimensioned that between the external container 6 and the waste-gas line 3 and between the inner container 4 and the waste-gas line 3 respectively are two cylindrical gaps 7 and 8. Air is drawn into the gaps 7, 8 at 9, from where it passes downwardly in the gaps, which may have baffled plates for increasing the heat transfer from the outside of the waste-gas line 3. The heated air leaves the gaps 7,8 at the lower end 10 thereof, and passes upwardlly around the lower edge of the cylinder 4, from where it passes upwardly through the scrap 5. The heat content of the air is delivered to the scrap located within the cylinder 4 as the air is drawn through said scrap. The cooled air leaves the apparatus through a suction pipe 11, which constitutes an extension of a sealing head 12 extending over the upper sealing flange 13 of the cylinder 4. The waste gases are drawn through the apparatus by means of a fan (not shown) or through the agency of a self draught from the waste-gas channel adjacent the waste-gas cleansing filter. The dried and/or pre-heated scrap is tapped from the apparatus through a sealing, insulated bottom flap 14, from where it is transported directly to the arc furnace.

The air expelled through the suction pipe 11 can, to advantage, be re-cycled to the inlet 9 leading to the gaps 7,8, for renewed heating. In this way, additional thermal energy be recovered, since said air has a residual temperature when it leaves the scrap.

The scrap can remain in its scrap bucket while being heated, in which case the bottom flap 14 is unnecessary and may be substituted with a permanent lining. FIG. 2 illustrates an embodiment which is built up substantially in the same way as the one according to FIG. 1 but where the scrap is kept in a bucket 15. Two places for buckets are arranged adjacent each other. This embodiment lends to a more effective use of heating equipment and hoists for buckets. Only one bucket is heated at a time viz. that one to which sealing head 12 with pipe 11 is connected. Sealing flange 13 in the embodiment according to FIG. 1 correponds to the upper part of bucket 15. In this case, however, a longer period of time is required to heat the scrap, since the bucket must also be heated. On the other hand, the use of a scrap bucket renders additional handling of the scrap unnecessary when said scrap is tapped from the apparatus.

The waste-gas line itself may form the inner container, in which case said line is in direct contact with the scrap.

In one conceivable embodiment of the invention, the air pipe can be drawn within the waste-gas line, for example in the same helical form as said line.

I claim:

1. An apparatus for drying and/or pre-heating lump material, such as scrap metal, with the aid of waste process gases discharged from process equipment such as an electric furnace or the like, said apparatus comprising:
   (a) a gas inlet (1) for connection to the said process equipment,
   (b) an external insulated container (6),
   (c) an inner container (4) forming a bottomless cylinder disposed concentrically within said external container for accommodating lump material (5) therein,
   (d) said external container (6) having a bottom flap (14) for emptying said lump material (5) therethrough,
   (e) a waste-gas line (3) connected to said inlet and helically wound in a space between said containers and forming a first cylindrical gap (7) with said external container (6) and a second cyindrical gap (8) with said inner container (4),
   (f) and means (11) for drawing air through said gap (7) and hence through said inner container (4) so that said air absorbs heat from the wall of said waste-gas line (3) and transfers the absorbed heat to the said lump material (5) by direct contact.

2. An apparatus for drying and/or pre-heating lump material, such as scrap metal, with the aid of waste process gases discharged from process equipment such as an electric furnace or the like, said apparatus comprising:
   (a) a gas inlet (1) for connection to the said process equipment,
   (b) an external insulated container (6),
   (c) an inner container (4) disposed within said external container for accommodating lump material (5) therein,
   (d) a waste-gas line (3) connected to said inlet and disposed in a space between said containers and forming a gap (7) with said external container (6),
   (e) and means (11) for drawing air through said gap (7) and hence through said inner container (4) so that said air absorbs heat from the wall of said waste-gas line (3) and transfers the absorbed heat to the said lump material (5) by direct contact,
   (f) said inner container (4) being concentrical with said external container (6), said waste-gas line (3) being helically wound in the space between the containers, so that a cylindrical gap (7) is formed at least between the waste-gas line (3) and the outer container (6).

3. A method of drying and/or pre-heating lump material, such as scrap metal, with the aid of waste process gases discharged from an electric arc furnace or the like, characterized by:
   (a) flowing the waste gases through a waste-gas line disposed between an external, outwardly insulated container and an inner container adapted to contain said lump material and wherein a gap is located between said waste-gas line and said external container,
   (b) drawing air through said gap so as to absorb heat from the wall of the waste-gas line,
   (c) thereafter passing said heated air through said lump material in said inner container to thereby deliver heat to said material,
   (d) and recycling said heated air back to said gap after it has passed through said lump material for further absorption of heat by said air from the wall of said waste-gas line.

* * * * *